(12) United States Patent
Appanna

(10) Patent No.: US 10,200,278 B2
(45) Date of Patent: Feb. 5, 2019

(54) NETWORK MANAGEMENT SYSTEM CONTROL SERVICE FOR VXLAN ON AN MLAG DOMAIN

(71) Applicant: Arista Networks, Inc., Santa Clara, CA (US)

(72) Inventor: Chandrashekhar Appanna, Saratoga, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 15/058,822

(22) Filed: Mar. 2, 2016

(65) Prior Publication Data
US 2017/0257309 A1  Sep. 7, 2017

(51) Int. Cl.
*H04L 12/709* (2013.01)
*H04L 12/46* (2006.01)

(52) U.S. Cl.
CPC ........ *H04L 45/245* (2013.01); *H04L 12/4633* (2013.01); *H04L 12/4641* (2013.01); *H04L 2012/4629* (2013.01)

(58) Field of Classification Search
CPC .................... H04L 45/245; H04L 12/4633; H04L 12/4641
See application file for complete search history.

(56) References Cited

U.S. PATENT DOCUMENTS

| | | | |
|---|---|---|---|
| 2014/0189094 A1* | 7/2014 | Ditya | H04L 45/245 709/224 |
| 2015/0124837 A1* | 5/2015 | Saltsidis | H04L 47/827 370/419 |
| 2016/0149751 A1* | 5/2016 | Pani | H04L 41/0668 370/221 |
| 2017/0171057 A1* | 6/2017 | Dong | H04L 45/02 |

* cited by examiner

*Primary Examiner* — Oussama Roudani
(74) *Attorney, Agent, or Firm* — Womble Bond Dickinson (US) LLP

(57) ABSTRACT

Various embodiments are described herein that provide a network system comprising a first network element coupled to a network and a second network element directly coupled to the first network element. The first network element and the second network element are to connect to form a link aggregation group. The system additionally includes a network management device including a control agent, where the control agent is configured to configure the link aggregation group as a logical virtual tunnel end point (VTEP) of a virtual local area network (VLAN).

19 Claims, 13 Drawing Sheets

LOGICAL VTEP MANAGEMENT LOGIC - 900

NETWORK MANAGEMENT SYSTEM CONTROL SERVICE FOR VXLAN ON AN MLAG DOMAIN

FIELD OF INVENTION

This invention relates generally to data networking and more particularly to the management of multi-chassis link aggregation in networked devices.

BACKGROUND OF THE DESCRIPTION

A key benefit of virtualization is the ability to move active virtual machines (VMs) among data center servers. However, when moving active VMs between servers, it is important to ensure that the VM's network connectivity will be maintained after the move to the destination server. One way to maintain connectivity is to keep the VM within the origin subnet. However, this limitation reduces the set of potential destinations to only those servers that are connected to the original subnet via layer 2 connectivity. One solution to this situation is to deploy a virtual extensible local area network (VXLAN) solution to enable a layer-2 overlay network between virtual machines over a layer-3 network. VXLAN encapsulates network traffic of virtualized workloads in standard IP packets. As a result, multiple VXLAN virtual networks can run over the same physical infrastructure.

However, manually configuring and maintaining VXLAN networks can become complex, particularly for large data centers that contain a large number of network forwarding elements. The difficulty becomes compounded as the complexity of the physical topology of the network increases. For example, the physical topology may include link aggregated network elements. Link aggregation applies to various methods of combining or aggregating multiple network connections in parallel in order to increase throughput to a network device beyond what a single connection could sustain. The configuration and management of link-aggregated devices prevent several configuration challenges. The manual configuration of link aggregation in combination with VXLAN configuration can be error prone and difficult to manage.

SUMMARY OF THE DESCRIPTION

Various embodiments are described herein that provide a network management system and associated logic to enable the automated configuration and management of a virtual extensible local area network configuration for network elements that are joined via a multi-chassis link aggregation (MLAG) mechanism. In one embodiment the network system comprises a first network element coupled to a network and a second network element directly coupled to the first network element. The first network element and the second network element are to connect to form a link aggregation group. The system additionally includes a network management device including a control agent. In one embodiment the control agent can configure the link aggregation group as a logical virtual tunnel end point (VTEP) of a virtual extensible local area network (VXLAN).

One embodiment provides for a non-transitory machine readable medium storing instructions which, when executed by one or more processors of a network device, cause the network device to perform operations comprising establishing a communication link with multiple network elements within a link aggregation domain, each network element within the link aggregation domain having a virtual tunnel endpoint (VTEP) with an identical identifier, configuring a logical VTEP including each VTEP within the link aggregation domain having the identical identifier, identifying a network element within the link aggregation domain that has been designated as a primary network element, and providing configuration information for the multiple network elements to the primary network element after the primary network element is identified.

One embodiment provides for a network element comprising a control plane including one or more processors and memory, wherein the control plane is to configure the network element as a member of a multi-chassis link aggregation group (MLAG) domain under management of an VLAN control agent external to the network element and a data plane coupled to the control plane, the data plane including a network interface having a peer port and non-peer port, the peer port to couple to an additional member of the MLAG domain and the non-peer port coupled to an external device, wherein the data plane is to receive network data from the VLAN control agent, the network data including configuration information for a logical virtual tunnel endpoint (VTEP) associated with a virtual extensible local area network (VXLAN) and transmit at least a portion of the configuration information to the additional member of the MLAG domain via the peer port.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
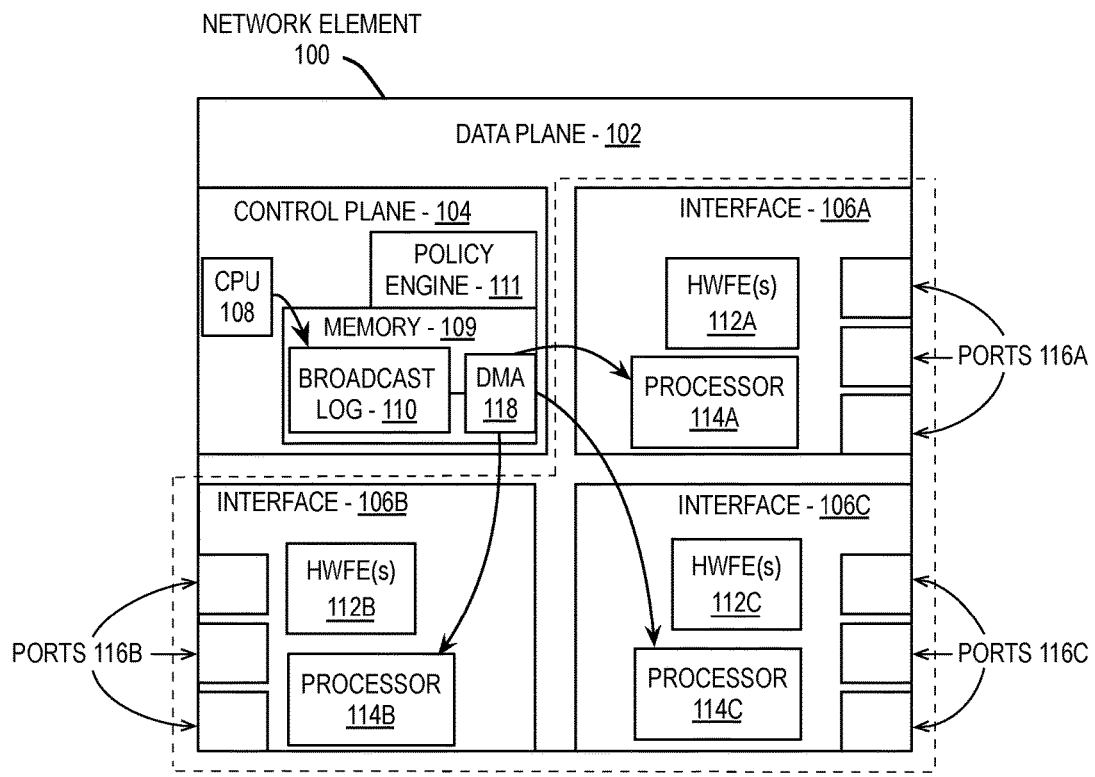
FIG. 1 is a block diagram of one embodiment of a network element including a data plane coupled to a control plane and several interface devices.

Embodiments described herein provide a network management system including logic to enable the automated configuration and management of a virtual extensible local area network configuration for network elements that are joined via a multi-chassis link aggregation (MLAG) mechanism. The network management system can enable the establishment of a redundant virtual tunnel end point (VTEP), in which multiple network elements function as a single VTEP to the network.

The configuration challenge presented is that the VXLAN configuration on each network element in the MLAG should be identical for proper operation to enable each network element within the MLAG to terminate and originate VXLAN data identically. Each network element in the MLAG can behave as a logical VTEP endpoint for the same VTEP address. Each network element can have full visibility into complete VXLAN reachability information for all virtual network instances (VNIs) that are associated with the VTEP that is represented by the network elements within MLAG.

Although the network elements within the MLAG will appear to be a single entity to the network, the network management system will be able to access and configure each network element within the MLAG independently. In one embodiment a topology agent of the network management system can discover and manage the physical topology of a network, including the various network elements and host devices, independently from to the logical topology in which the network is configured. The network elements connect and register with the network management system independently and the network management system can view and edit configuration and status for each network element as an individual device even though the MLAG appears as a single VTEP to the network.

Once the network elements connect and register with the network management system, the topology agent of the network management system can publish a new virtual interface to represent the aggregated interfaces of the MLAG and can present the MLAG network elements to the reset of the network as a single entity having the same name and identifier. Additionally, when interacting with software defined networking (SDN) controllers or virtual machine controllers, the network management system can present the MLAG to the controllers as a single entity.

The network management system can configure the network elements of the MLAG via a VTEP management logic executing on a management node of the network. In one embodiment, to minimize the amount of configuration network traffic is directed to the management nodes of the network management system, a primary network element within the MLAG can be selected or elected as the primary contact for the MLAG. The VTEP management logic can identify a network element within the MLAG that has been designated (e.g., selected or elected) as a primary network element. The logical VTEP management logic can provide configuration information for all network elements associated with the logical VTEP to the primary network element after the primary network element is identified and the primary network element can distribute this configuration to the other network elements. Additionally, the VTEP management logic of the network management system includes failover logic to response to the failure of a network element within the MLAG.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C, in one embodiment, using the broadcast log 110. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive, process, and/or forward network traffic. Each of the interface devices 106A-C includes multiple ports 116A-C that can be used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can read and write from a broadcast log 110 in the control plane 104 to program the corresponding hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), XML APIs, JSON APIs, Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a direct memory access (DMA) controller 118 is coupled to the memory 109 to allow processors 114A-C direct access to the memory 109. In one embodiment, the DMA controller 118 allows the processors 114A to directly access the broadcast log 110 without requiring the CPU 108 in the control plane 104 to send data to each processor 114A-C. In one embodiment, the control plane 104 includes a policy engine 111 to apply a QoS policy to network traffic flowing through the network element 100. The policy engine 111 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the data plane 102 can be a stream of network frames, datagrams or data packets, or other types of discretely switched network data. In one embodiment, the network element 100 communicates network data between various networked devices using a variety of communicating techniques (e.g., layer-2 switching, layer-3 routing, traffic shaping, applying a quality of service (QoS) policy, etc.).

Figure 2:
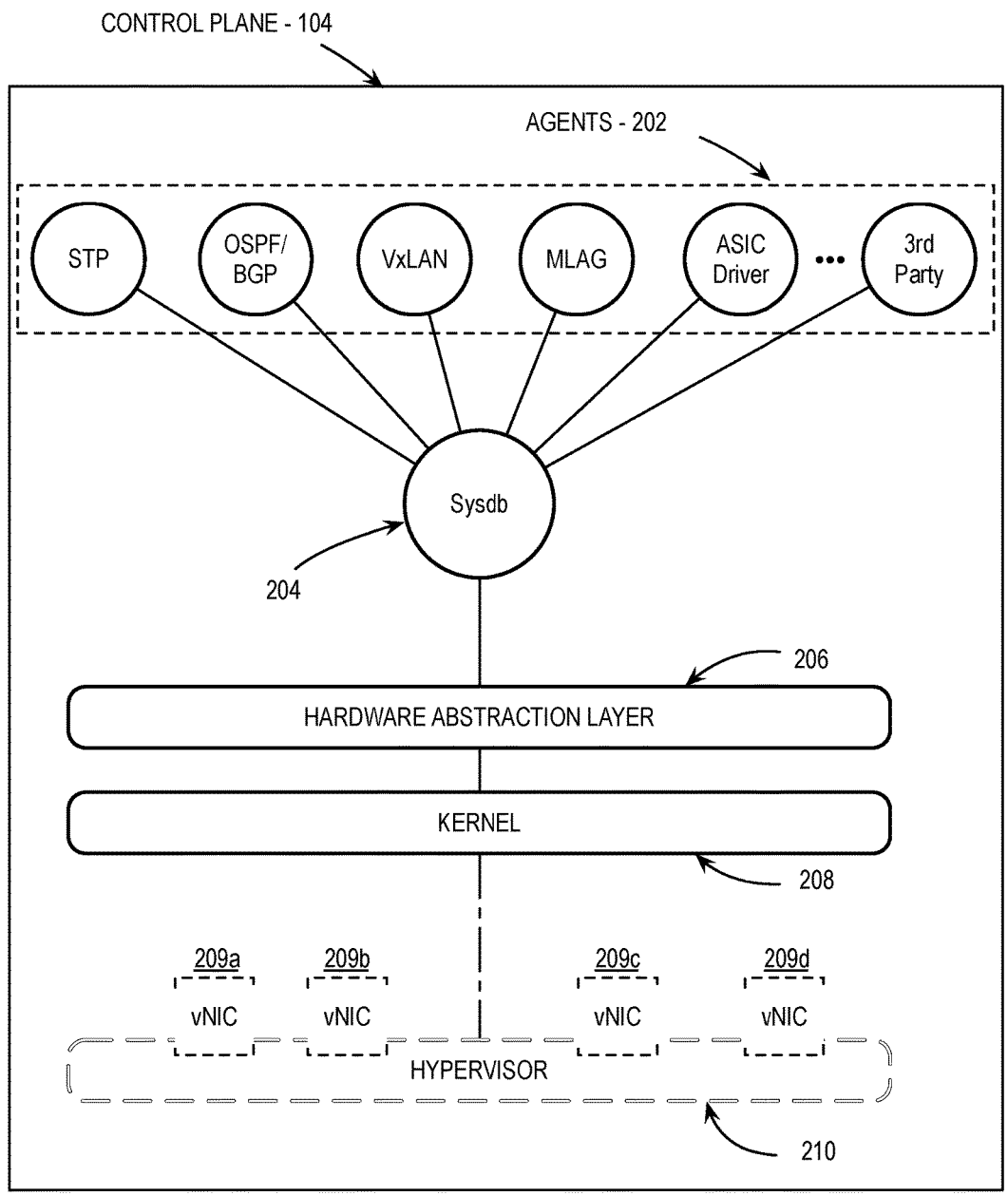
FIG. 2 is a block diagram of a network element operating system, according to an embodiment.

FIG. 2 is a block diagram of a network element operating system 200, according to an embodiment. In one embodiment, the network element operating system 200 resides in the control plane (e.g., control plane 104) of a network element 100 as in FIG. 1. The network element operating system 200 includes multiple agents 202 including, but not limited to agents to perform operations to implement Spanning Tree Protocol (STP), Open Shortest Path First (OSPF)/Border Gateway Protocol (BGP), Virtual eXtensible LAN (VXLAN), and Multi-Chassis Link Aggregation (MLAG). The agents can additionally include one or more forwarding drivers for an application specific integrated circuit (ASIC), as well as third-party agents. In one embodiment, the agents each communicate with a central system database (e.g., Sysdb 204). In one embodiment, the network element operating system 200 additionally includes a hardware abstraction layer 206 to abstract hardware specific details to enable the network element operating system 200 to operate on a variety of different hardware associated with different models and implementations of network elements. A kernel 208 provides core operating system functionality such as scheduling and base level system resource management. In one embodiment, the network element operating system 200 can be operated within a virtual machine, and can provide virtual network interface cards (vNIC 209a-d) via a hypervisor 210.

In one embodiment, each of the multiple agents 202 interfaces with the Sysdb 204 to record configuration state and operational status. In such embodiment, agents in the system can mount the Sysdb 204 to send and receive configuration and status. Read and write permissions can be specified for each mount. In one embodiment, Sysdb utilizes an event-driven publish/subscribe model. If the configuration state of an agent changes, Sysdb can send an event notification to that agent, which will then update its local copy. Similarly when the agent writes to the Sysdb mount, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in shared memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

Multi-Chassis Link Aggregation

Figure 3:
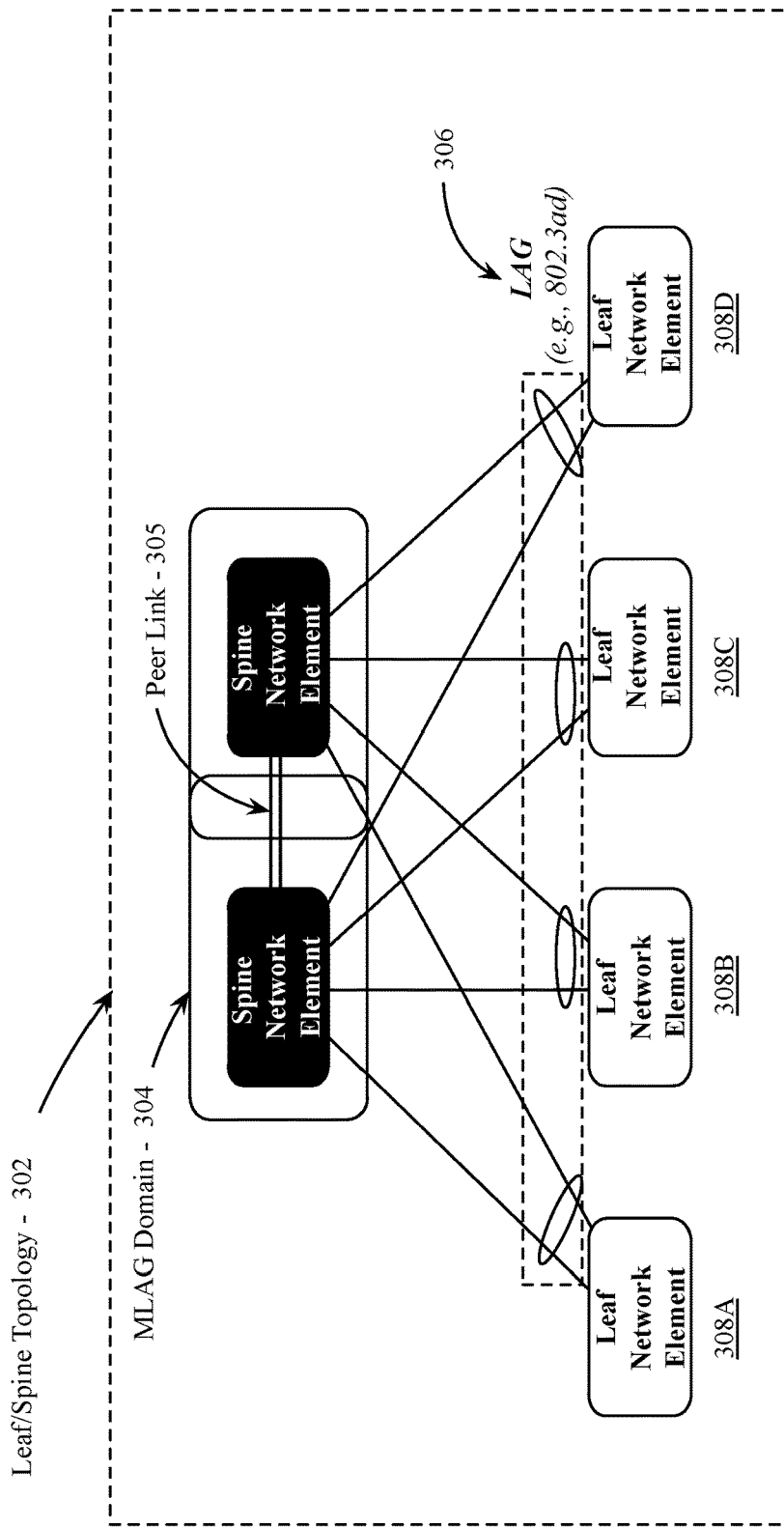
FIG. 3 is a block diagram of a layer-2 protocol fabric with MLAG, according to an embodiment.

FIG. 3 is a block diagram of a layer-2 protocol fabric with MLAG 300, according to an embodiment. In one embodiment the layer-2 (L2) protocol fabric is arranged in a leaf/spine topology 302. While Link aggregation is shown at the spine level, MLAG may also be used at the leaf level to interconnect host devices to the network. The illustrated topology includes an MLAG domain 304. The MLAG domain 304 includes a set of two or more network elements in an aggregated configuration. In one embodiment, the network elements within an MLAG domain 304 are connected via a peer link 305. The peer link 305 is used to enable communication and synchronization between the MLAG peers 304. Multiple redundant links may be used to create the peer link 305. The multiple redundant links can be assigned to a specific peer link virtual local area network (VLAN), such that peer link data can be isolated from other network traffic.

The aggregated spine network elements connect to a set of leaf network elements 308A-D, which may be Top of Rack (ToR) switches, or other network elements that terminate connections for hosts, storage, and other service nodes. In one embodiment, each of the network elements 308A-D is doubly connected to the MLAG domain 304 in the spine level via a set of active-active 802.3ad connections of the link aggregation groups 306. Each link aggregation group, which are also known as "port channels," enables network traffic to be balanced across each link. Additionally, the link aggregation grouping provides for redundancy should one of the links in group fail.

In a traditional network design, interconnecting network elements in the manner illustrated may result in a forwarding loop. Accordingly STP may block the interface on the link farthest from the root port, but allow for failover of blocked links in the event of link failure. However, with MLAG enabled, the MLAG peers 304 appear to each doubly connected leaf network element 308A-D as a single logical network element and each LAG 306 appears as a single logical link that has a data rate that is the aggregate of the two links.

Figure 4:
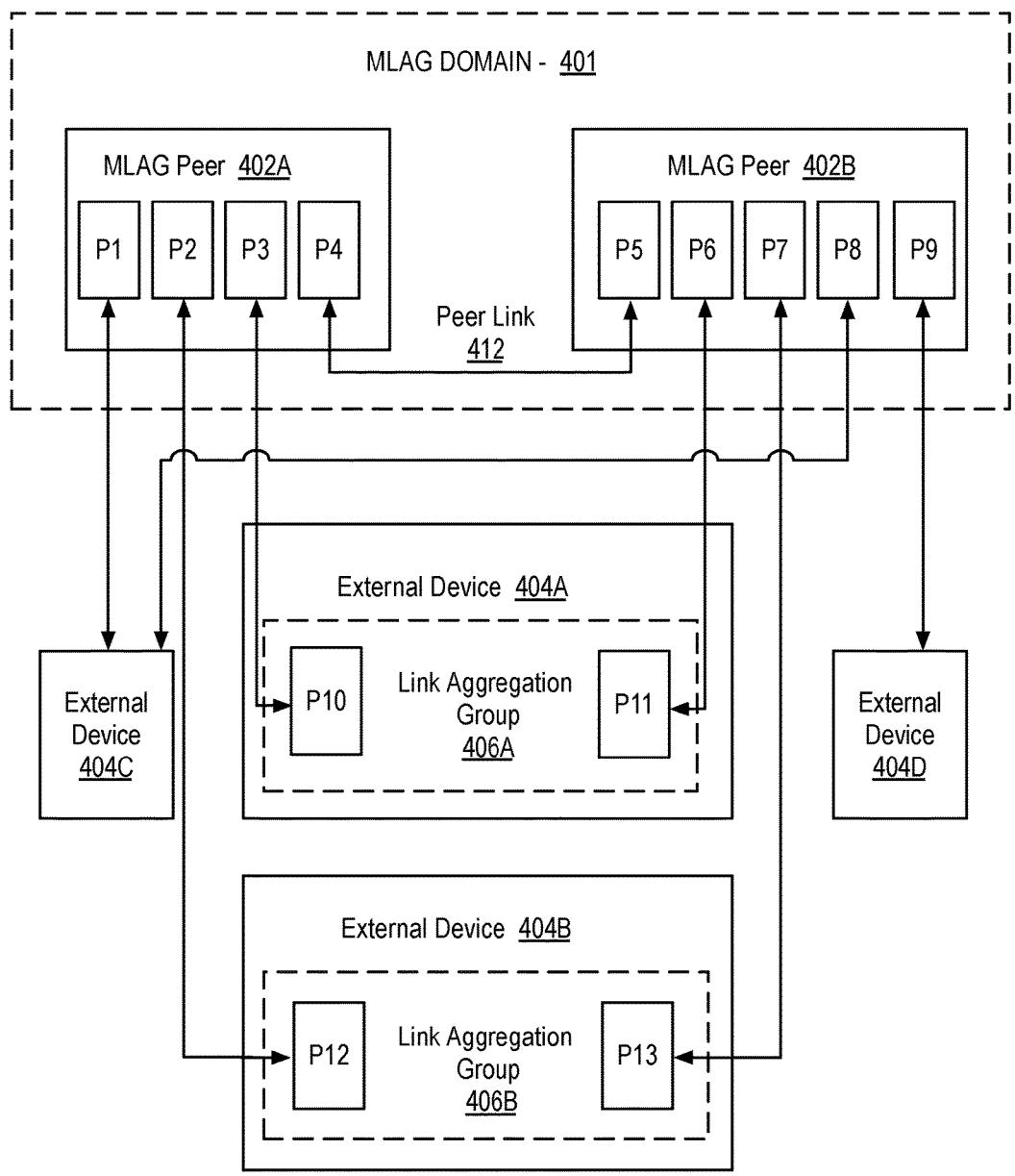
FIG. 4 shows a network element system using MLAG, according to an embodiment.

FIG. 4 shows a network element system 400 using MLAG, according to an embodiment. The network element system 400 includes a set of network elements configured as MLAG peers 402A-B, which may be MLAG peers 304 as in FIG. 3. In one embodiment the MLAG peers 402A-B define an MLAG domain 401. Each MLAG peer 402A-B includes at least one port, but the specific number of ports is not limited. For example, MLAG peer 402A is illustrated as including four ports (P1-P4), while MLAG peer 402B is illustrated as having five ports (P5-P9).

In one embodiment each of the ports P1-P9 can couple to one or more external devices 404A-D, which may be other network elements or networked host devices. Ports connected to an MLAG peer may be referred to as peer ports. At least one port on each MLAG peer 402A-B is configured as a peer port, which is used to form a peer link 412 between the MLAG peers 402A-B. In one embodiment the peer link 412 is a wired connection, although a peer link may also be configured using a tight band wireless link. While one peer link 412 is shown between port P4 and port P5, multiple peer links may be formed between MLAG peers 402A-B. The peer link 412 is connected, established, and/or active when at least one link that is part of the peer link is active. Where the peer link 412 is a physical link, the link is considered to be active when peer ports (e.g., P4 and P5) on each side of the link are active.

A port that is not used to connect the MLAG peers 402A-B may be referred to as a non-peer port. For example, ports P1-P3 of MLAG peer 402A and ports P6-P9 of MLAG peer 402B are non-peer ports that couple to external devices 404A-D. When a network element configured as an MLAG peer 402A-B, the network element is configured to receive a unit of network data (e.g., packet, frame, datagram, etc.) via a non-peer port and determine whether to drop the unit of network data, process the unit of network data as part of a layer-2 control protocol (e.g., Spanning Tree Protocol (STP), Link Aggregation Control Protocol (LACP), Internet Group Management Protocol (IGMP)), or forward the unit of network data via another port.

The determination of whether to drop or forward the data is determined at least in part by whether the MLAG peers 402A-B are configured to forward via a layer-2 (L2) protocol or a layer-3 (L3) protocol. If a network element configured as an MLAG peer 402A-B is operating as a L2 device, the network element uses the destination media access control (MAC) address in the received unit of network data along with a forwarding table stored in memory (e.g., shared memory) of the network element to determine an egress port from which the unit of network data will be forwarded. If the network element is operating as an L3 device, the network element uses the destination L3 protocol address, such as an Internet protocol (IP) address stored in a header of the received unit of network data along with a routing table stored in memory to determine the egress port from which the unit of network data will be forwarded.

In one embodiment, the external devices 404A-D may be a network element (e.g., a switch, a router, etc.), a computer system, or any other device that is able to connect to at least one port in the MLAG domain. For example the MLAG domain 401 may be in the spine layer of a network topology, as with MLAG peers 304 of FIG. 3, and external devices 404A-B may be leaf layer network elements, such as one of leaf network elements 308A-D of FIG. 3. The computer system (with a processor, memory, and persistent storage) may correspond to any type of system that is configured to send and receive network data. Additionally, each network element may be configured with the network element operating system 200 of FIG. 2.

In one embodiment, each external device may be a singly connected device or a dually connected device. A singly connected device is connected to a single port on one of the MLAG peers 402A-B. A dually connected device is connected to at least one port on each of the MLAG peers 402A-B in the MLAG domain 401. For example, external device 404C is a dually connected device that is connected to port P1 of MLAG peer 402A and port P8 of MLAG peer 402B. If an external device is dually connected, then the ports on the external device that are connected to the MLAG domain 401 are collectively referred to as a link aggregation group (e.g., LAG groups 306 as in FIG. 3). For example, external device 404A includes a link aggregation group 406A that includes port P10 and port P11. External device 404B includes a link aggregation group 406B that includes port P12 and port P13.

In one embodiment, for dually connected external devices 404A-C, the MLAG domain 401 appears as a single network element, which may or may not present the same device ID as presented to singly connected external device 404D. For example, from the perspective of external devices 404A-B the MLAG domain 401 appears as a single network element with a single media access control (MAC) address that is different from the MAC addresses of the either of the MLAG peers 402A-B and of ports P1-P9. Further, external device 404A operates as if ports P10 and P11 of link aggregation group 406A are connected to the same network element. External device 404B operates as if ports P12 and P13 of link aggregation group 406B are connected to the same network element. A similar configuration may exist for the network ports of external device 404C.

In one embodiment, to behave, or at least to appear to be a single network element, one of the peers in the MLAG domain 401 is designated as a primary peer and one peer is designated as a secondary peer. The primary peer is responsible for implementing control plane functionality for the MLAG domain 401. Control plane functionality includes implementing the spanning tree protocol (STP) for the MLAG domain 401, which includes generating all configuration bridging protocol data unit messages (also referred to as STP configuration messages), issuing the STP configuration messages over one or more ports in the MLAG domain 401 and processing the received STP configuration messages in accordance with STP. In one embodiment the secondary peer implements its own instance of STP using the STP configuration messages received by the MLAG domain 401.

However, the results of processing the STP configuration messages are not used while the primary peer is active. The MLAG peers 402A-B share forwarding table information via the peer link 412, such that the MLAG peers 402A-B use synchronized forwarding tables. In one embodiment the individual MLAG peers 402A-B each implement their own instance of various layer-2 control protocols such as LACP and IGMP. In one embodiment, while the individual MLAG peers 402A-B implement separate instances of LACP, the MLAG peers 402A-B use the MAC address associated with the MLAG domain 401 (instead of the MAC addresses that are associated with the individual MLAG peers 402A-B).

In one embodiment, both MLAG peers 402A-B are implemented as symmetric MLAG, such that there is no designation of a primary and secondary peer in the MLAG domain 401. In such embodiment, the MLAG peers both implement symmetric coordinated instances of STP for all non-peer ports on the MLAG peer. Further, each of the MLAG peers can implement separate instances of the various layer-2 protocols.

With respect to the forwarding tables, when a unit of network data is received on a port in the MLAG domain 401 and there is no entry in the forwarding table on the MLAG peer that received the unit of network data, the MLAG peer that received the data is responsible for generating the forwarding table entry. To generate a forwarding table entry, the MLAG peer 402A-B can first determine whether the ingress unit of network data was received from a port that is part of a link aggregation group (e.g., link aggregation groups 306, 406A-B). If the data was received from a port that is associated with a link aggregation group, the network data is forwarded out of all ports of the MLAG peer, including at least one peer port if there are any singly-connected external devices on the other MLAG peer, except for the ports associated with the ingress link aggregation group.

For example and in one embodiment, an ingress unit of network data received from link aggregation group 406A that has a destination address that is not present in the forwarding table may be flooded to all enabled ports in the MLAG domain 401 other than ports P3 and P6. However, those skilled in the art will appreciate that ports from which network data will be sent are subject to VLAN membership tests, STP topology tests, and/or one or more access control lists (ACLs). Once the information for the forwarding table entry is obtained (e.g., which port in the MLAG peer is associated with the destination MAC address in the ingress unit of network data), the MLAG peer stores this information in its forwarding table and provides the information to the other MLAG peer in the MLAG domain 401. The other MLAG peer may use this information along with link aggregation group information (if present) to generate a forwarding table entry.

In a further example, assuming a unit of network data that is destined for link aggregation group 406A of external device 404A is received at MLAG peer 402B from external device 404B via port P7, and there is no forwarding table entry for the destination MAC associated with link aggregation group 406A, MLAG peer 402B can forward the unit of data out of ports P6, P8, and P9. Once MLAG peer 402B determines that network data with a destination MAC address associated with link aggregation group 406A (e.g., corresponding to external device 404A) should be forwarded via port P6. This forwarding information can be stored in a forwarding table entry in MLAG peer 402B. The forwarding information is also forwarded to MLAG peer 402A, which can create a forwarding entry that associates the MAC address for link aggregation group 406A with port P3. MLAG peer 402A is able to create the forwarding entry because the MLAG peer has information that indicates port P3 of MLAG peer 402A and port P6 of MLAG peer 402B are in a link aggregation group.

Logical VTEPs on an MLAG Domain

Figure 5:
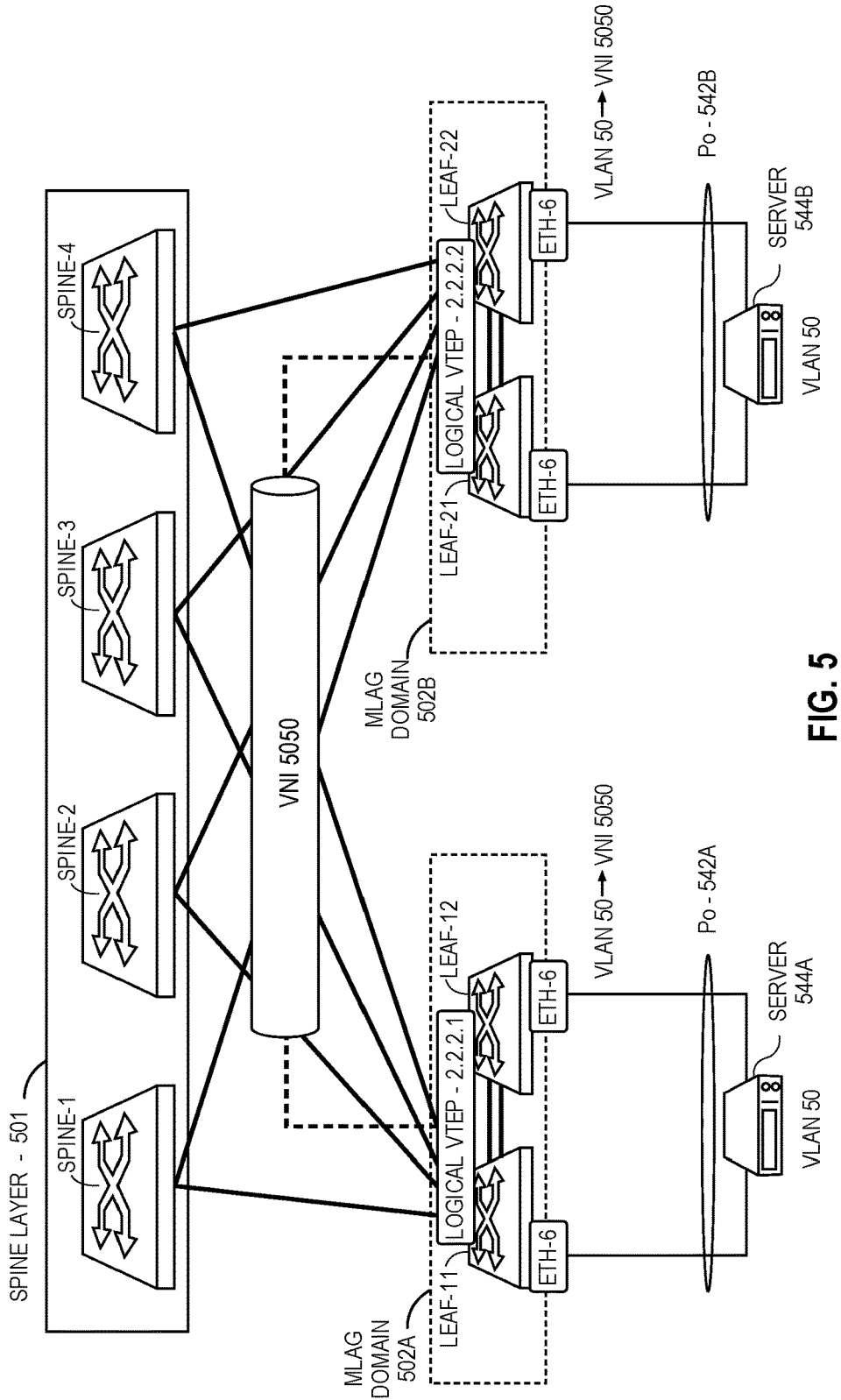
FIG. 5 is an illustration of logical VTEP leaf nodes within a leaf/spine network, according to an embodiment.

FIG. 5 is an illustration of logical VTEP leaf nodes within a leaf/spine network 500, according to an embodiment. The leaf/spine network 500 can configured in the leaf/spine topology 302 of FIG. 3, where a spine layer 501 includes multiple spine network elements (Spine-1 through Spine-4), where each network element in the spine layer 501 is doubly connected to a pair of logical VTEPs (e.g., 2.2.2.1 and 2.2.2.2) created from a pair of MLAG domains 502A-B. While the MLAG domains 502A-B are illustrated containing two network elements, in one embodiment two or more network elements may be used.

As illustrated, a first logical VTEP (2.2.2.1) can be created from a first MLAG domain 502A having a first set of leaf nodes (leaf-11, leaf-12). A second logical VTEP (2.2.2.2) can be created from a second MLAG domain 502B having a second set of leaf nodes (leaf-21, leaf-22). In one embodiment a logical VTEP can be created on an MLAG domain by configuring a virtual tunnel identifier for the physical VTEP of each network element to have the same identifier. In one embodiment, the relevant virtual tunnel identifier can be an L3 address, such as an IP address. In such embodiment, when the virtual tunnel identifiers associated with a set of network elements in an MLAG domain are configured to have the same IP address, the VTEPs in the MLAG domain behave as a single logical VTEP.

The VTEPs can be used to provide L2 connectivity between the MLAG domains 502A-B and network devices coupled to the MLAG domains 502A-B (e.g. server 544A-B). Each logical VTEP of the MLAG domains 502A-B can be configured to communicate using the same virtual network interface (VNI) (e.g., VNI 5050). A port channel 542A-B (e.g., LAG) can be configured between each MLAG domain 502A-B and servers 544A-B. A common VLAN (e.g., VLAN 50) can be configured for the port channels 542A-B. The logical VTEPs can then forward any network data between the servers 544A-B via VLAN (e.g., VXLAN) encapsulation and de-encapsulation.

While the logical VTEP configuration can be performed manually, in one embodiment a network management system can be used to remotely provision the VTEP configuration for a MLAG domain in the network.

Network Management System

In one embodiment, a network management system is provided that enables a network-wide approach for workload orchestration and workflow automation and can provide a turnkey cloud networking solution. The network management system has visibility into the configuration state and operational status of the set of network elements operating within a network. This network management system, in one embodiment, can be configured for enable the provisioning and maintenance of VXLAN for an MLAG domain.

In one embodiment, each network element in the network includes a software system, (e.g., network element software system 200 as in FIG. 2) which continually communicates with the central network management system to synchronize state and receive configuration changes or updates. The central network management system is not limited to any specific software defined network management system, but may be any system which coordinates software configurable network elements in a network and/or datacenter environment.

Figure 6:
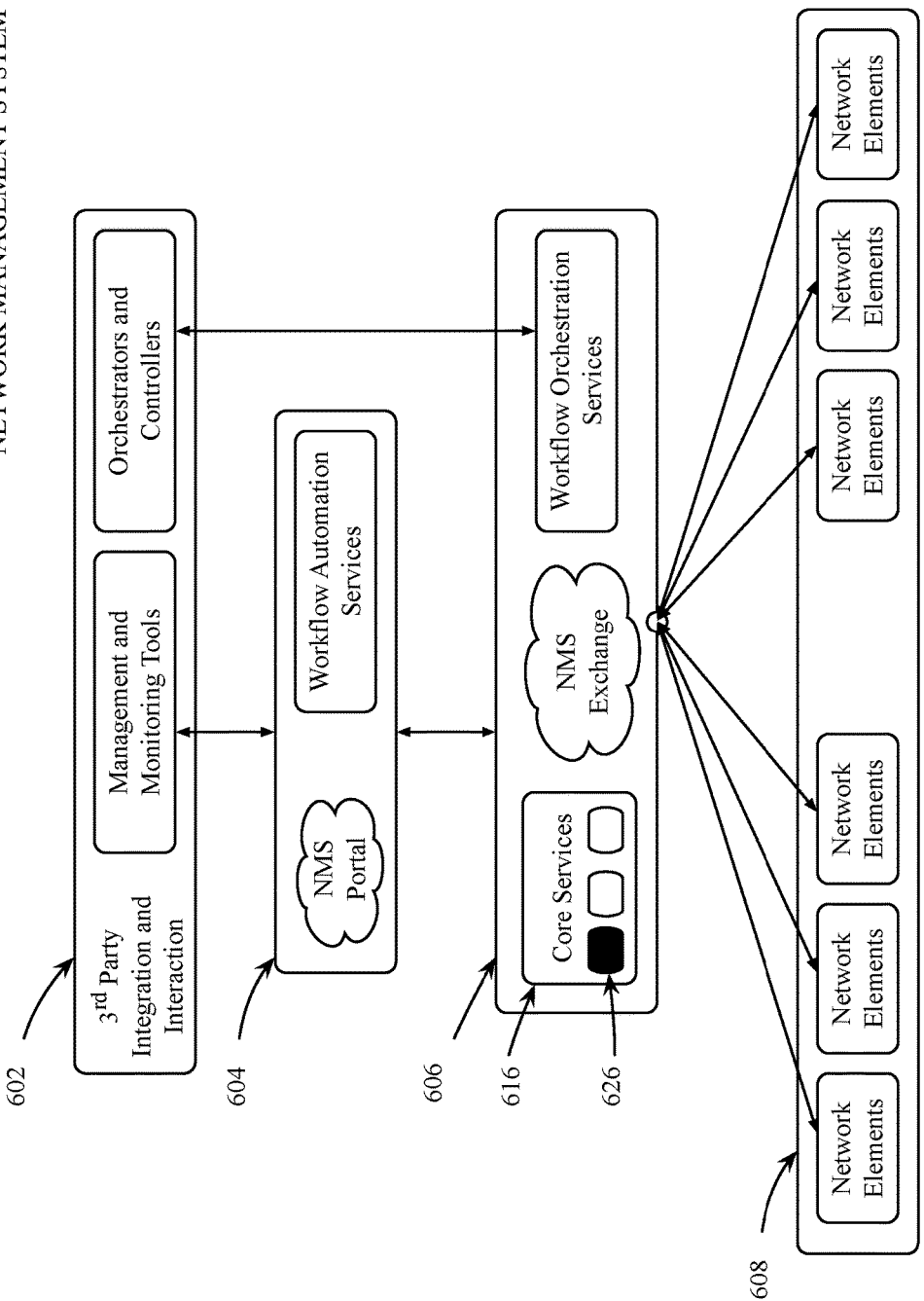
FIG. 6 is a block diagram of a network management system, according to an embodiment.

FIG. 6 is a block diagram of a network management system 600, according to an embodiment. The network management system 600 may be a variant of the CloudVision® Framework provided by Arista Networks™ of Santa Clara, Calif. In one embodiment the network management system 600 has a multi-layer/multi-tier architecture including a $3^{rd}$ party integration and interaction layer 602, a network management system (NMS) portal layer 604, and an NMS exchange layer 606. The network management system 600 may execute as a VM based virtual server on a network management device. One or more portions of the network management system 600 may also be configured to execute within the control plane of a one or more network elements within the network.

The $3^{rd}$ party integration and interaction layer 602 can include management and monitoring tools, as well as orchestrators and controllers that are provided by $3^{rd}$ party service providers to manage and control a set of network devices. The $3^{rd}$ party service provider tools in the $3^{rd}$ party integration and interaction layer 602 can communicate with an NMS portal layer 604. The NMS portal layer 604 provides a mechanism for the network to achieve cloud scale automation without significant additional development effort. In one embodiment, the NMS portal layer 604 includes workflow automation services that automate network services and provide zero touch provisioning capability for network elements in a network element layer 608, such that network elements may be coupled to the network and centrally provisioned via software. For example, a set of binary software images for the network elements in the network element layer 608 can be stored in a repository and staged for loading onto the network element.

The NMS portal layer 604 can communicate with an NMS exchange layer 606. The NMS exchange layer 606, in one embodiment, is a network-side multi-function control point that may be configured to execute on a network element in the network element layer 608 or can be deployed as virtual machine executing on a host coupled to a network element. The NMS exchange layer 606 includes a set of workflow orchestration services and core services 616 that provide core management services for the network management system. Once the NMS exchange layer 606 is deployed, network elements can be connected to provide a single point for real-time provisioning, orchestration and integration with multi-vendor (e.g., $3^{rd}$ party) controllers. Automatic topology discovery can be performed to utilize state and status information received from each network element in the network element layer 608. The received state and status information can be aggregated and used to provide an overview of the functions and operations of each network element in the network.

In one embodiment, the core services 616 provided by the NMS exchange layer 606 includes a VXLAN Control Service (VCS) agent 626. The VCS agent 626 enables VXLAN learning by leveraging information available via the NMS exchange layer 606 instead of, for example, using multicast flooding. The VCS agent 626 can configure VXLAN on the various network elements in the system by utilizing APIs provided by the operating system of the network elements (e.g., operating system 200 of FIG. 2). Such APIs can enable the VCS agent 626 to read and modify information in the central database of each network element.

The VCS agent 626 can configure and monitor all VXLAN VTEPS in a data center. The NMS exchange layer can learn the disposition of all VTEPs. The VTEP disposition includes a physical and virtual topology of networks serviced by the VTEPs and the devices running on those networks. Combining topology information, VTEP configuration and operational state allows controller and monitoring tools to leverage the VCS agent 626 to manipulate and visualize network state. The VCS agent 626 can also provide configurable, automated data plane broadcast, unknown, and multicast (BUM) services for VTEPS in the data center and can complement orchestration platforms by providing mechanisms that ensure the reachability of all devices running on dynamically configured virtual networks.

When the VCS agent 626 is configured to manage a logical VTEP created by an MLAG domain, the amount of configuration information managed by the VCS agent 626 is multiplied, as the VCS agent 626 manages each physical VTEP within the logical VTEP (e.g., one physical VTEP per network element). In one embodiment the amount of network traffic to manage the physical VTEPs within a logical VTEP is reduced by electing a single network element within the MLAG domain to transact management and configuration communications for all network elements within the MLAG domain.

In one embodiment the VCS agent 626 reports any logical VTEPs to SDN and VM controllers as a single network unit, even though the logical VTEPS are an aggregation of multiple network elements. In one embodiment, not all interfaces of either network element within an MLAG logical VTEP are configured as a member of the VTEP, as some interfaces can be configured to be independent of the logical VTEP. In that instance, the VCS agent 626 can present the logical VTEP as a single network element, and separately present the network elements including separately configured interfaces. In the example of an MLAG logical VTEP having a two network elements, up to three network elements may be presented to the network and to SDN/VM controllers. One network element represents the combined MLAG and logical VTEP, which has a separate network address than the underlying network elements, and each underlying network element having non aggregated (e.g., orphaned) ports. The underling network elements associated with the orphaned ports will have separate addresses and identifiers.

Cloud Managed Logical VTEP

Figure 7:
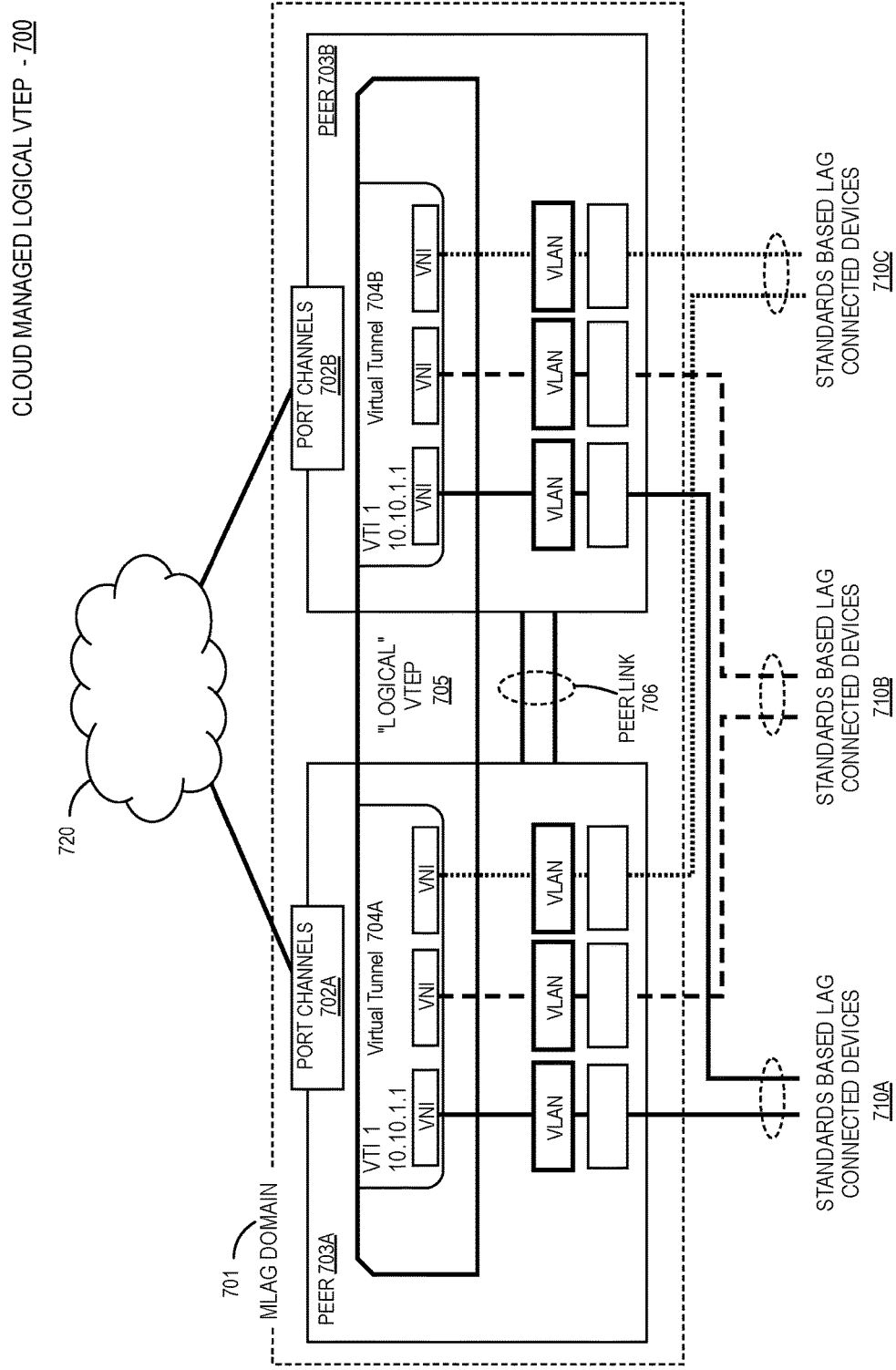
FIG. 7 is an illustration of a cloud managed logical VTEP, according to an embodiment.

FIG. 7 is an illustration of a cloud managed logical VTEP 700, according to an embodiment. Each peer 703A-B in the MLAG domain 701 can connect to the network 720 via port channels 702A-B that provide redundant and aggregated connectivity to the network 720. The peers 703A-B are connected via a peer link 706 created by one or more direct network connections between the peers 703A-B. In one embodiment the links in the peer link 706 are assigned to a separate peer link VLAN to isolate peer network traffic. Each peer 703A-B includes a virtual tunnel 704A-B that can be configured to encapsulate or de-encapsulate VLAN (e.g., VXLAN) data. Multiple standards based lag connected devices 710A-C can be connected to the MLAG domain 701 via port channels or LAGs created for doubly connected devices coupled to the MLAG domain 701

The VCS agent 626 of the network management system 600 of FIG. 6 can be configured to enable automated provisioning and maintenance for a logical VTEP 705 created by a set of peers 703A-B in an MLAG domain 701. In one embodiment the VCS agent 626 can reside at any location on a network 720 to which the MLAG domain 701 is connected. The VCS agent 626 can be used to remotely configure the MLAG domain 701 as a logical VTEP 705 and to provide dynamic updates to the physical and virtual topology of the connected devices. To create the logical VTEP 705, the VCS agent 626 can configure the virtual tunnels 703A-B of the peers 703A-B with the same virtual tunnel interface (VTI), which may be an L3 address, such as an IP address. For example, the virtual tunnels 704A-B of FIG. 7 are each shown having the same VTI (e.g., VTI 1) which may be mapped or associated with an IP address (e.g., 10.10.1.1). Once the logical VTEP 705 is created, the standards based LAG connected devices 710A-C on VLANs serviced by the MLAG domain can be connected with devices on the same VLAN within the network 720.

In one embodiment, to avoid multiplicative updates to each peer 703A-B in an MLAG domain 701 associated with a logical VTEP 705, the VCS agent 626 can select a single peer with which to communicate VXLAN configuration and status updates, such as new or updated MAC address table data for devices within VLANs connected to the logical VTEP 705, or other VLAN/VXLAN related forwarding information. Updates can include network information for hundreds of thousands of physical and virtual devices. Accordingly, selecting a single peer can significantly reduce the amount of update information that must be transmitted over the network. The peer that is selected to communicate with the VCS agent 626 can receive one instance of the updated network information and then communicate the updates to each peer 703A-B via the peer link 706.

The specific manner of selection can vary across several embodiments. In one embodiment, if the MLAG domain 701 is configured with a primary and secondary peers, the VCS agent 626 can select the primary MLAG peer for communication of VLAN/VXLAN configuration and update information. In one embodiment the peers 703A-B within an MLAG domain 701 can hold an election once the peers 703A-B are configured as the logical VTEP 705. The elected peer can then communicate with the VCS agent 626 on behalf of all peers. In one embodiment, each peer 703A-B in the MLAG domain 701 can attempt to communicate with the VCS agent 626. The VCS agent 626 can then select one of the peers as a primary peer to which updates will be communicated for all peers in the MLAG domain 701 that make up the logical VTEP 705. In such embodiment, for a small amount of time, the VCS agent 626 may be in communication with multiple peers within the logical VTEP 705, but can cease communication with all but the primary peer after a primary peer is selected. The selection mechanism issued by the VCS agent 626 can vary. In one embodiment, the VCS agent 626 will select as primary the first peer within the logical VTEP 705 that initiates communication and, after a period of time, cease communication with all but the primary peer associated with the logical VTEP 705.

The logical VTEP is reported to SDN controllers and/or VM managers as a single VTEP. In one embodiment, should the logical VTEP 705 not encompass all interfaces or ports within the peers 703A-B, the ports or interfaces not associated with the logical VTEP can be reported as belonging to the underlying network elements.

Figure 8:
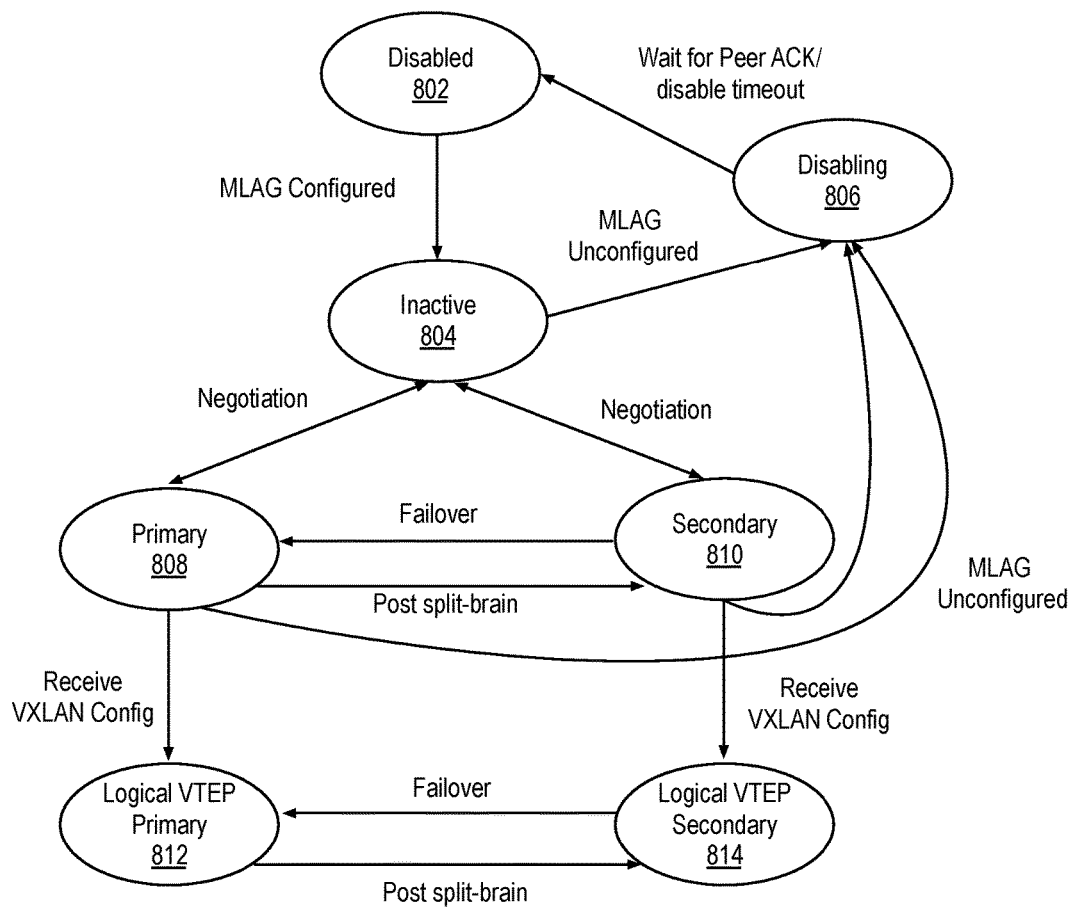
FIG. 8 is a flow diagram of logical VTEP management logic, according to an embodiment.

FIG. 8 is a state diagram illustrating MLAG configuration state transitions 800, according to an embodiment. The state diagram illustrates state transitions for a single network element of an MLAG containing two network elements (e.g., an MLAG pair). Forming an MLAG pair requires applying an MLAG configuration to each network elements, establishing a peer link, and waiting for the MLAG protocol to stabilize. Each network element begins in the MLAG disabled state 802 for the MLAG protocol. Once MLAG is configured, the network element transitions into an inactive state 804 and begins a negotiation with the MLAG peer of the network element.

Negotiation between the MLAG peers result in a transition of each network element into either a primary MLAG state 808 or a secondary MLAG state 810. While in the secondary MLAG state 810, a network element can transition into the primary MLAG state 808 during a failover event due to the failure of the primary network element or the peer link between network elements. In the event the failover event occurs due to a false failure, for example, when the secondary assumes the failure of a functional primary MLAG peer due to a lost peer link connection, a split-brain condition occurs. In such event, the network management system 600 includes logic to resolve the split-brain condition and revert the network element to the secondary MLAG state 810. At any point, MLAG can be unconfigured on the network element, causing the network element to transition to a disabling state 806. After an acknowledgement from the other MLAG peer or a disable timeout, the network element can transition back to an MLAG disabled state 802.

Once a network element has stabilized in the primary MLAG state 808 or the secondary MLAG state 810, the network element can receive a VXLAN configuration and can be configured as a VTEP. To configure a logical VTEP, each network element receives the same VXLAN configuration. Once the network element receives a VXLAN configuration, the network element can publish a VTEP status containing the VTEP ID, which may be an Internet protocol address, and other VTEP attributes. The network element can also publish a VNI status containing the MAC addresses that are local to the VTEP. As the Primary MLAG peer will publish a non-empty list of addresses. The secondary peer will publish an empty list of addresses. The VCS agent of the network management system (e.g., VCS agent 626 of FIG. 6-7), upon receiving the empty VNI status from the network element configured as the secondary peer, the VCS agent will transition the network element to a logical VTEP secondary state 814. Upon receiving the non-empty VNI status from the network element configured as the primary peer, the VCS agent will transition the network element to a logical VTEP primary state 812 and provide the network element with a list containing the collection of all MAC addresses in a VNI and the VTEPs that front each of them. The network element in the logical VTEP primary state 812 can then transfer the MAC address, VNI, and VTEP information to the network element configured in the logical VTEP secondary state 814 via the peer link between the network elements. The network element on the logical VTEP secondary state 814 can transfer locally learned MAC address information to the primary network element. While in the logical VTEP primary state 812, the network element will publish MAC addresses learned on either network element in the VCS agent. In the event the network elements are already configured as identical VXLAN VTEPs, after the MLAG pair is negotiated and stable, the network element in the primary MLAG state 808 can continue to publish a VNI status, while the network element in the secondary MLAG state 810 will withdraw the contents of a previously published VNI status.

The network elements of the logical VTEP, in conjunction with the network management system 600 of FIG. 6, can perform failover and post split-brain state transitions in a manner similar to the transitions performed in the primary MLAG state 808 and the secondary MLAG state 810. Should a network element in the logical VTEP secondary state 814 lose contact with the primary network element, the network element will conduct a failover operation that causes a transition into the logical VTEP primary state 812. While in the logical VTEP primary state 812, the network element will publish learned VNI status information for the logical VTEP to the VCS agent of the network management system and receive forwarding database updates from the VCS agent. However, in the event of a split-brain condition where multiple network elements are in the logical VTEP primary state, the VCS agent can ignore duplicate status publications from the logical VTEP and the split-brain condition can be resolved by transitioning the network element back into the logical VTEP secondary state 814.

Figure 9:
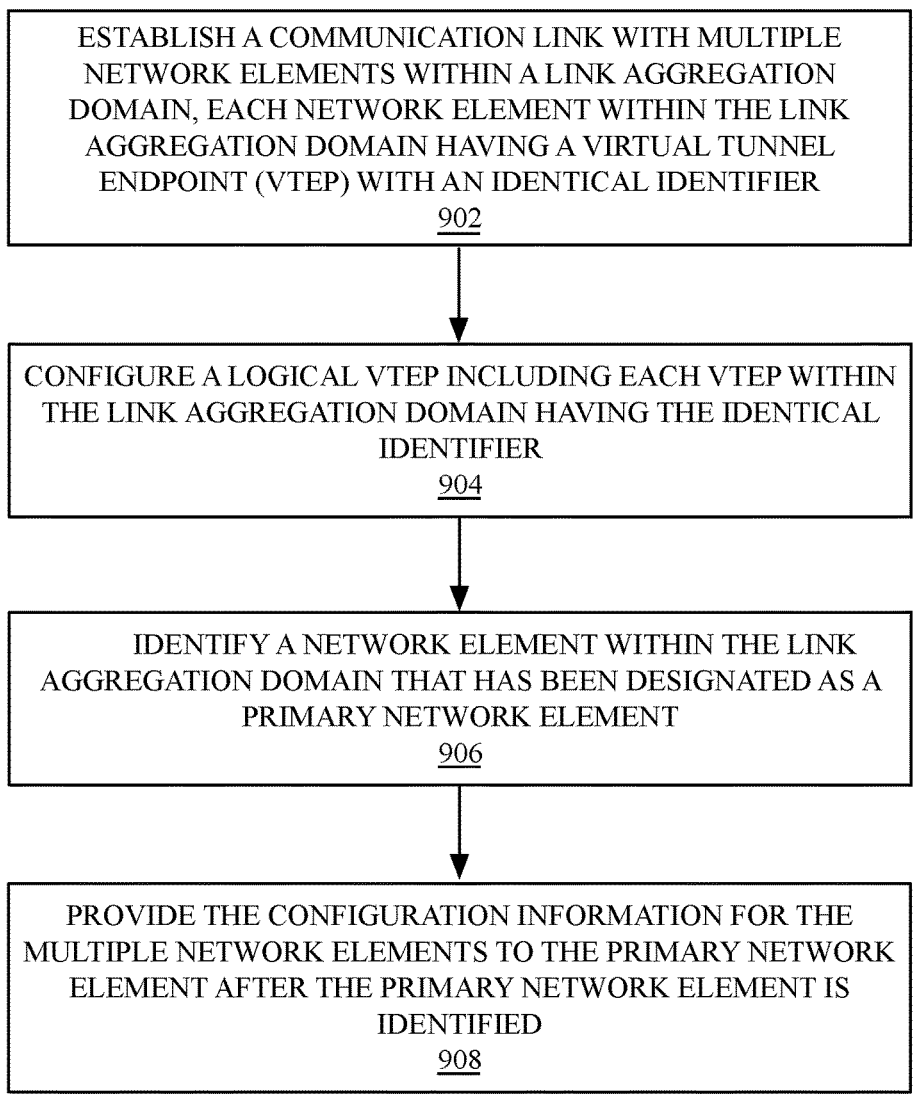
FIG. 9 is a flow diagram of logical VTEP primary election logic, according to an embodiment.

FIG. 9 is a flow diagram of logical VTEP management logic 900, according to an embodiment. In one embodiment the logical VTEP management logic 900 can be performed by an agent of a network management system, such as the VCS agent 626 of FIG. 6. In one embodiment the logical VTEP management logic 900 includes logic to perform operations to establish a communication link with multiple network elements within a link aggregation domain, each network element within the link aggregation domain having a virtual tunnel endpoint (VTEP) with an identical identifier, as shown at block 902. At block 904, the logical VTEP management logic 900 can configure a logical VTEP including each VTEP within the link aggregation domain having the identical identifier. At block 906 the logical VTEP management logic 900 can identify a network element within the link aggregation domain that has been designated as a primary network element. At block 908 the logical VTEP management logic 900 can provide the configuration information for each of the multiple network elements associated with the logical VTEP to the primary network element after the primary network element is identified. The configuration information, in one embodiment, includes forwarding database status and information for VTEPs and VNIs connected with the logical VTEP.

In one embodiment the logical VTEP management logic 900 can provide configuration information for the logical VTEP to multiple network elements within the link aggregation domain for a period of time and then select one of the multiple network elements within the link aggregation domain for designation as the primary network element. In one embodiment the first network element in the link aggregation domain to communicate with the logical VTEP management logic 900 is selected as the primary network element for purposes of logical VTEP management.

In one embodiment the network element identified as the primary network can be selected as the primary network element based on a negotiation between the multiple network elements within the link aggregation domain that is performed at the time in which the MLAG is established. For example, as described with respect to FIG. 8, when the primary MLAG peer reports a non-empty VNI status containing a list of MAC addresses that are local to the VTEP, thus the logical VTEP management logic 900 can designate the primary MLAG peer as the primary logical VTEP network element. However, not all embodiments are configured as such and in one embodiment the logical VTEP management logic 900 can select a network element as a primary network element without regard to which network element is the MLAG primary network element. In general, the VTEP management logic 900 can detect that there is more than source for a given VTEP based on the VTEP ID in the VTEP status published by the network elements in the logical VTEP. When multiple network elements have the same VTEP identifier, then those network elements are considered to represent the same VTEP and the VTEP management logic 900 can automatically arrange the network elements into a logical VTEP and publish VNI status only to one of the network elements of the logical VTEP.

In one embodiment the logical VTEP management logic 900 can monitor the operational status of each VTEP of the logical VTEP and respond to a failure of any VTEP within the logical VTEP. For example, in response to detection of a failure of a VTEP associated with the designated primary network element, the logical VTEP management logic 900 can designate a new primary network element.

Figure 10:
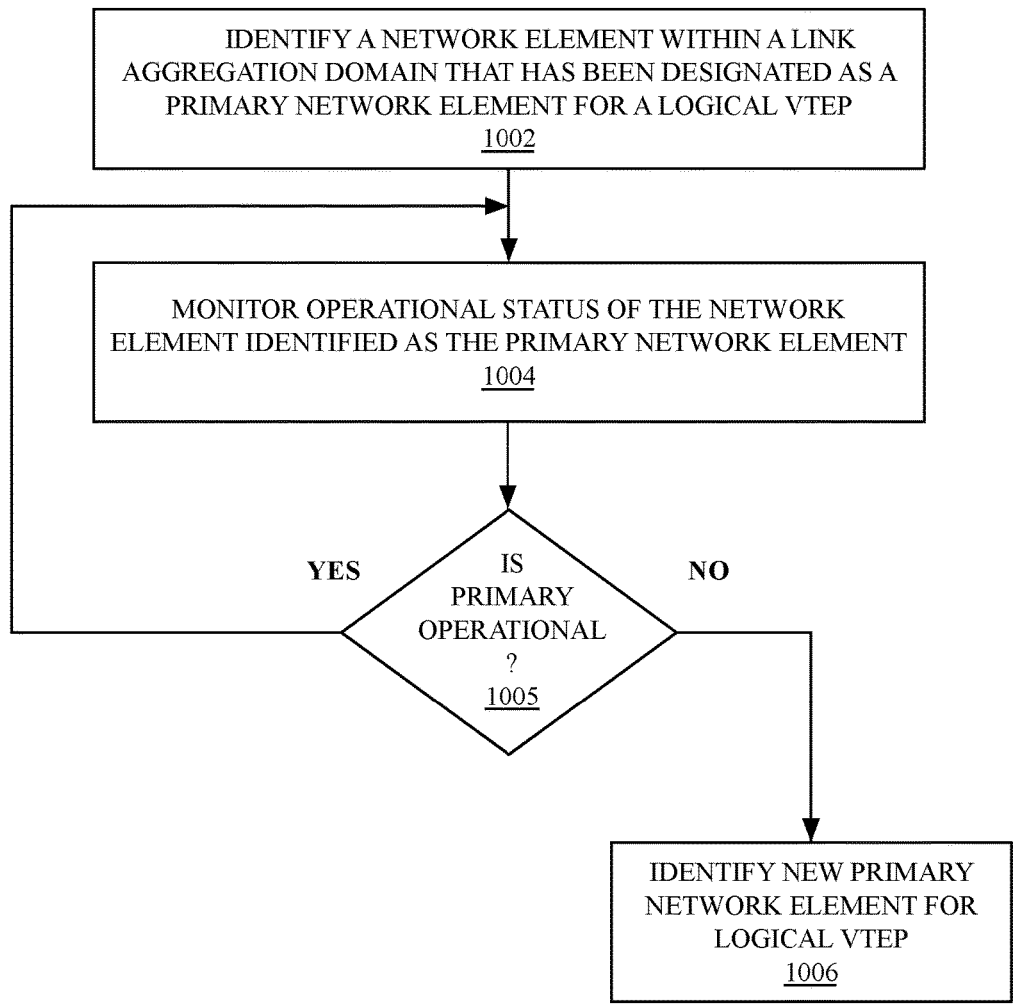
FIG. 10 is a flow diagram of logical VTEP failure recovery logic, according to an embodiment.

FIG. 10 is a flow diagram of logical VTEP failure recovery logic 1000, according to an embodiment. In one embodiment the logical VTEP failure recovery logic 1000 can be performed by an agent of a network management system, such as the VCS agent 626 of FIG. 6. The logical VTEP failure recovery logic 1000 can identify a network element within a link aggregation domain that has been identified (e.g., elected, selected, etc.) as a primary network element for a logical VTEP, as shown at block 1002. The logical VTEP failure recovery logic 1000 can then monitor an operational status of the network element identified as the primary network element. Monitoring the operational status can include periodically polling the operational status or subscribing to the operational status of the primary network element using a subscription mechanism provided by the network management system.

If at 1005, for example, via the polling or subscription mechanism, the logical VTEP failure recovery logic 1000 determines the primary network element is no longer operational the logical VTEP failure recovery logic 1000 can identify a new primary network element for the logical VTEP, as shown at block 1006. Otherwise, the logical VTEP failure recovery logic 1000 can return to block 1004 to monitor the operational status of the network element, or can perform other operations until notified (e.g., via a subscription) that the operational status of the primary network element has changed.

The VTEP failure recovery logic 1000 can also be performed in the event of an in service software update (ISSU). However, no changes will be required by the VTEP failure recovery logic 1000 during an ISSU event in which the secondary is updated. The MLAG pair will appear as a non-MLAG network element publishing the same VTEP and VNI status as the logical VTEP once the secondary network element is brought down. The secondary can then resume activities as a logical VTEP secondary network element once the network element returns to an active state.

During an ISSU event in which the primary is updated a transition occurs as though the primary network element for the logical VTEP has failed, and the VTEP failure recovery logic 1000 will identify a new primary network element for the logical VTEP, as shown at block 1006. Additional detail on ISSU is provided in FIG. 11.

Figure 11:
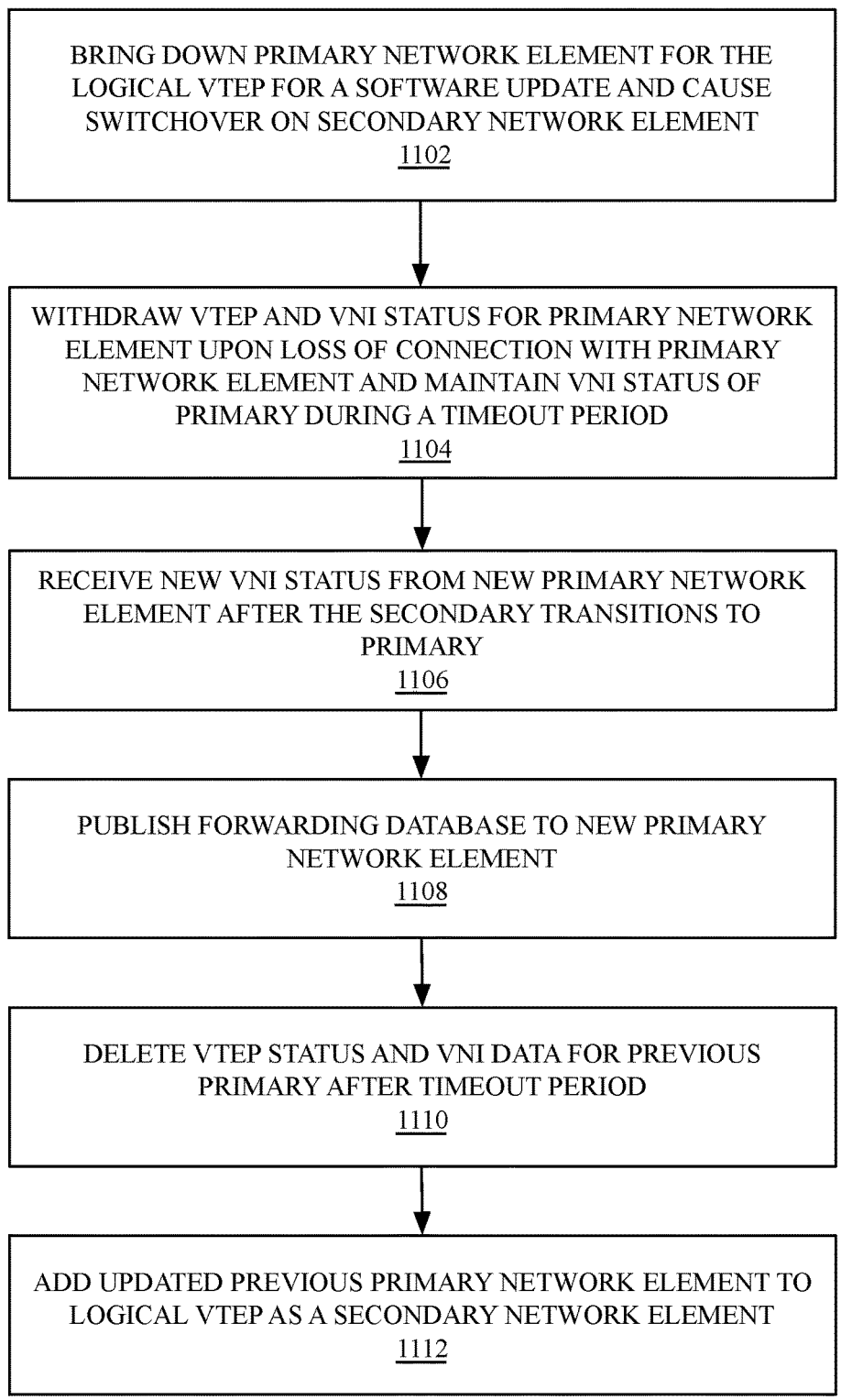
FIG. 11 is a flow diagram of logical VTEP in service software update logic, according to an embodiment.

FIG. 11 is a flow diagram of in service software update logic 1100 for a logical VTEP, according to an embodiment. In one embodiment the logical VTEP failure recovery logic 1000 of FIG. 10 can be leveraged when performing a software update on a logical VTEP primary network element. The logical VTEP ISSU logic 1100 can bring down the primary network element for the logical VTEP for a software update, which cause a switchover on a secondary network element, as shown at block 1102. Once a loss of connection is detected with the primary network element, the VTEP ISSUE logic 1100 can withdraw or cause the withdrawal of the VTEP and VNI status information associated with the primary network element, as shown at block 1104. However, the VTEP and VNI status associated with the former primary network element will be retained during a timeout period in response to a loss of connection with a logical VTEP primary network element, as the logical VTEP can continue to function due to the presence of the one or more secondary network elements in the logical VTEP. Once the switchover is complete and a new primary network element for the logical VTEP is operational, the logical VTEP ISSU logic 1100 will receive new VNI Status from the new primary network element, as shown at block 1106. The logical VTEP ISSU logic 1100 then publishes forwarding database information to the new primary network element, as shown at block 1108. After a timeout period, the logical VTEP ISSU logic 1100 can delete VEP status and VNI data associated with the previous primary network element after the timeout period, as shown at block 1110. When the software update is complete in the previous primary, the logical VTEP ISSU logic can add the updated pervious primary network element to the logical VTEP as a secondary network element, as shown at block 1112.

Exemplary Data Processing System and Modular Network Element

Figure 12:
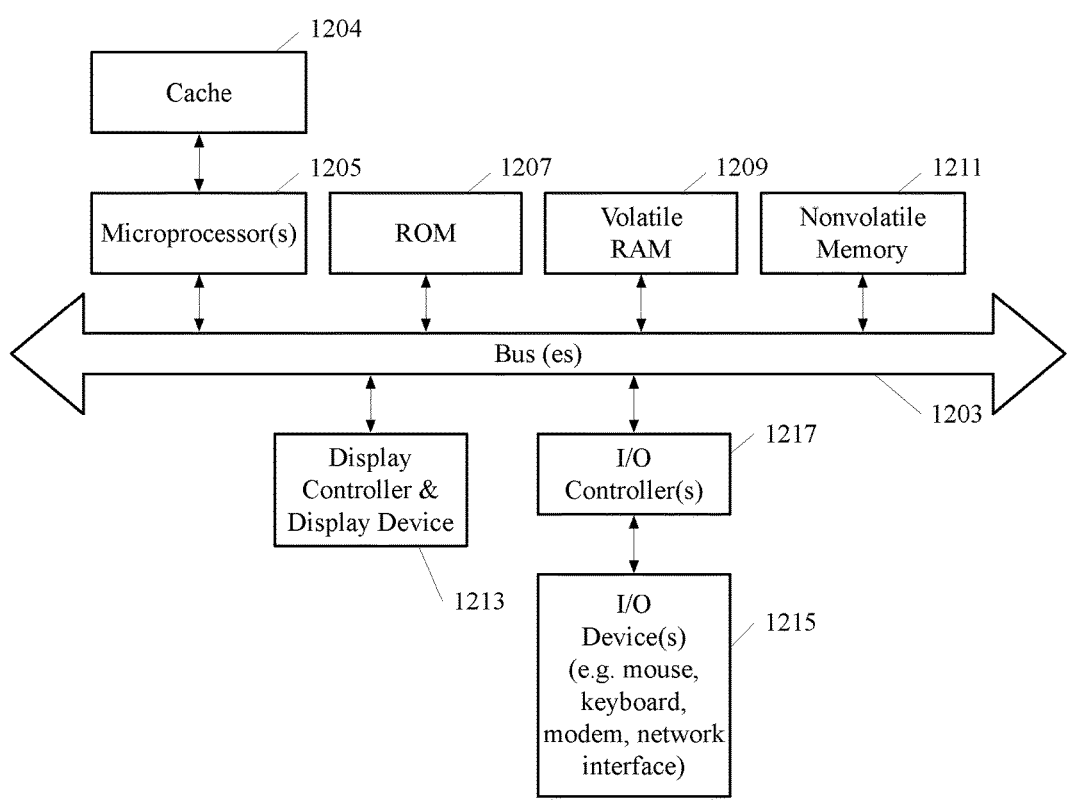
FIG. 12 shows one example of a data processing system, which may be used with one embodiment.

FIG. 12 shows one example of a data processing system 1200, which may be used with one embodiment of the present invention. For example, the data processing system 1200 may be implemented including one or more of network element 100 as in FIG. 1. In one embodiment, the data processing system 1200 is used within the control plane of a network element described herein. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1200 includes one or more bus(es) 1203 which couple to one or more microprocessor(s) 1205, ROM (Read Only Memory) 1207, volatile RAM 1209 and a non-volatile memory 1211. In one embodiment, the one or more microprocessor(s) 1205 couple to a cache 1204, which can include one or more sets of instruction and/or data caches. The bus(es) 1203 may include one or more buses connected to each other through various bridges, controllers and/or adapters as is well known in the art.

The microprocessor(s) 1205 may retrieve the instructions from the memories 1207, 1209, 1211 and execute the instructions to perform operations described above. Instructions and/or associated data retrieved from the memories 1207, 1209, 1211 may be stored in the cache 1204. The bus(es) 1203 interconnect system components with each other, and to a display controller and display device 1213, and to peripheral devices such as input/output (I/O) devices, which may be mice, keyboards, modems, network interfaces, printers and other devices well known in the art. Typically, the input/output devices 1215 are coupled to the system via input/output controller(s) 1217. The volatile RAM (Random Access Memory) 1209 is typically implemented as dynamic RAM (DRAM), which requires power continually in order to refresh or maintain the data in the memory, but may also include static ram (SRAM), which does not require a periodic refresh.

In one embodiment, the non-volatile memory 1211 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1211 will also be a random access memory although this is not required. While FIG. 12 shows that the non-volatile memory 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 13:
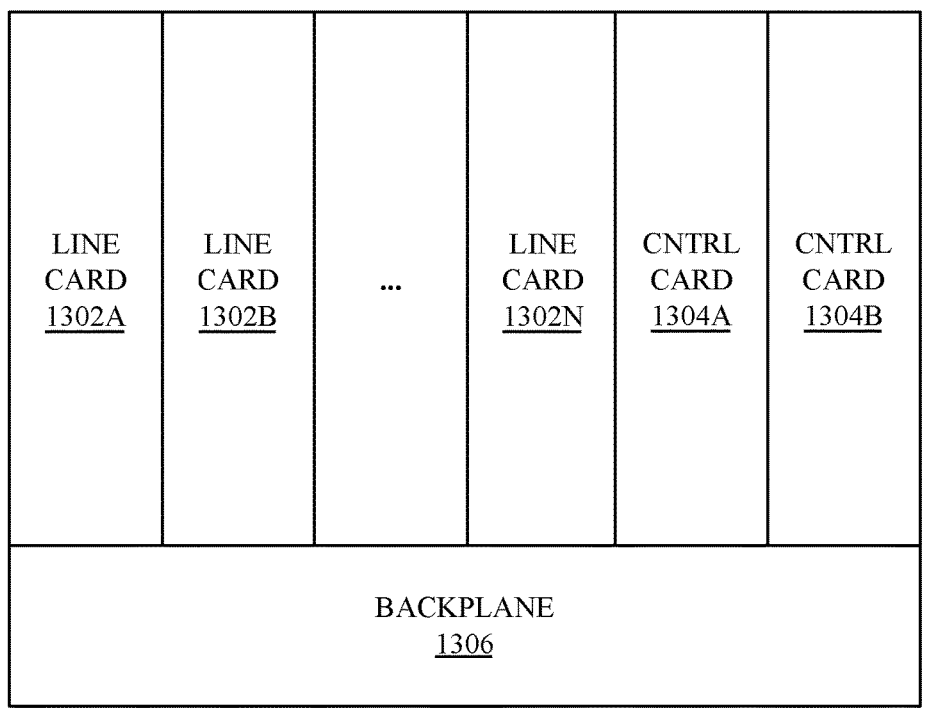
FIG. 13 is a block diagram of an additional embodiment of an exemplary modular network element as described herein.

FIG. 13 is a block diagram of an additional embodiment of an exemplary modular network element 1300 as described herein. In one embodiment, the network element has a modular and expandable configuration that allows the addition or removal of resources configured as line cards 1302A-N, or controller cards 1304A-B coupled to a backplane 1306. In one embodiment, the controller cards 1304A-B control the processing of the traffic by the line cards 1302A-N, which can each include one or more network data forwarding devices such as interfaces 106A-C as in FIG. 1, although the precise nature of the forwarding devices is not limited as such. In one embodiment, the line cards 1302A-N process and forward traffic according to the network policies received from controller cards the 1304A-B. In one embodiment, one or more of the line cards 1302A-N can monitor and report internal performance data, such as latency data for all or selected units of network data traversing the network element. In one embodiment, the controller cards 1304A-B can also be configured to perform all or a sub-set of functions provided by the line cards 1302A-N. It should be understood that the architecture of the network element 1300 illustrated in FIG. 13 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network system comprising:
    a first network element coupled to a network;
    a second network element directly coupled to the first network element, wherein the first network element and the second network element are to connect to form a link aggregation group; and
    a network management device including a control agent, the control agent to configure the link aggregation group as a logical virtual tunnel end point (VTEP) of a virtual extensible local area network (VXLAN), wherein each of the first and second network elements synchronizes a local forwarding table with a forwarding table of another network element in response to a new forwarding entry being generated by one of the first and second network elements and the control agent is further to receive status information for the logical VTEP from a primary network element designated for the link aggregation group, the status information including a physical and virtual topology of a network coupled to the logical VTEP and one of the first and second network element is the primary network element.

2. The network system as in claim 1, wherein the logical VTEP includes a first VTEP associated with the first network element and a second VTEP associated with the second network element.

3. The network system as in claim 2, wherein the first VTEP and the second VTEP share a layer 3 address.

4. The network system as in claim 3, wherein the control agent is to provide configuration information to the primary network element selected from the first network element and the second network element of the link aggregation group.

5. The network system as in claim 4, wherein the control agent is to select one of the first network element or the second network element as the primary network element of the link aggregation group.

6. The network system as in claim 4, wherein the link aggregation group is to elect one of the first network element or the second network element as the primary network element.

7. The network system as in claim 4, wherein the primary network element is to receive configuration information from the control agent and provide the configuration information to a secondary network element via a peer link between the primary network element and the secondary network element.

8. The network system as in claim 7, wherein the configuration information includes a set of media access control (MAC) address information for a first set of network devices coupled to the first network element and a second set of network devices coupled to the second network element.

9. The network system as in claim 7, wherein the control agent is to disregard a communication request received from the secondary network element after a primary network element is designated for the link aggregation group.

10. A non-transitory machine readable medium storing instructions which, when executed by one or more processors of a network device, cause the network device to perform operations comprising:
establishing a communication link with multiple network elements within a link aggregation domain, each network element within the link aggregation domain having a virtual tunnel endpoint (VTEP) with an identical identifier;
configuring a logical VTEP including each VTEP within the link aggregation domain having the identical identifier;
identifying a network element within the link aggregation domain that has been designated as a primary network element; and
providing configuration information for the multiple network elements to the primary network element after the primary network element is identified, wherein each of the multiple network elements synchronizes a local forwarding table with a forwarding table of another network elements in response to a new forwarding entry being generated by one of the multiple network elements and the control agent is further to receive status information for the logical VTEP from the primary network element designated for the link aggregation group, the status information including a physical and virtual topology of a network coupled to the logical VTEP and one of the first and second network element is the primary network element.

11. The non-transitory machine readable medium as in claim 10, wherein the network element within the link aggregation domain is designated as the primary network element via an election among the multiple network elements within the link aggregation domain.

12. The non-transitory machine readable medium as in claim 10, the operations further comprising:
providing configuration information for the logical VTEP to multiple network elements within the link aggregation domain for a period of time;
selecting one of the multiple network elements within the link aggregation domain for designation as the primary network element; and
providing additional configuration for all network elements associated with the logical VTEP to the primary network element.

13. The non-transitory machine readable medium as in claim 10, wherein providing the configuration information for the logical VTEP includes providing media access control (MAC) address information for network devices coupled to a virtual network interface that is coupled to the logical VTEP.

14. The non-transitory machine readable medium as in claim 10, the operations further comprising:
monitoring operational status of each VTEP of the logical VTEP;
detecting a failure of the VTEP associated with the network element designated as the primary network element; and
designating a new primary network element.

15. A network element comprising:
a control plane including one or more processors and memory, wherein the control plane is to configure the network element as a member of a multi-chassis link aggregation group (MLAG) domain under management of an VLAN control agent external to the network element; and
a data plane coupled to the control plane, the data plane including a network interface having a peer port and non-peer port, the peer port to couple to an additional member of the MLAG domain and the non-peer port coupled to an external device, wherein the data plane is to receive network data from the VLAN control agent, the network data including configuration information for a logical virtual tunnel endpoint (VTEP) associated with a virtual extensible local area network (VXLAN) and transmit at least a portion of the configuration information to the additional member of the MLAG domain via the peer port, wherein network element is to synchronize a local forwarding table with a forwarding table of the other network elements in the MLAG domain in response to a new forwarding entry being generated by network element and the control agent is further to receive status information for the logical VTEP from a primary network element designated for the link aggregation group, the status information including a physical and virtual topology of a network coupled to the logical VTEP and the network element is the primary network element.

16. The network element as in claim 15, wherein the network element has been designated as the primary network element for the logical VTEP, the primary network element to receive configuration information for the logical VTEP from the VLAN control agent and distribute at least a portion of the configuration information to each other member of the logical VTEP.

17. The network element as in claim 16, wherein the network element is designated as the primary network element for the logical VTEP by the VLAN control agent.

18. The network element as in claim 16, wherein the portion of the configuration information transmitted to the additional member of the MLAG includes a set of media access control (MAC) addresses for network devices coupled to the logical VTEP.

19. The network element as in claim 16, wherein the control plane is to store at least a portion of the configuration information for the logical VTEP into the memory and at least a portion of the memory is shared with the data plane.

* * * * *